J. NELSON.
HAY LOADER.
APPLICATION FILED MAR. 6, 1909.
956,145.
Patented Apr. 26, 1910.
3 SHEETS—SHEET 3.
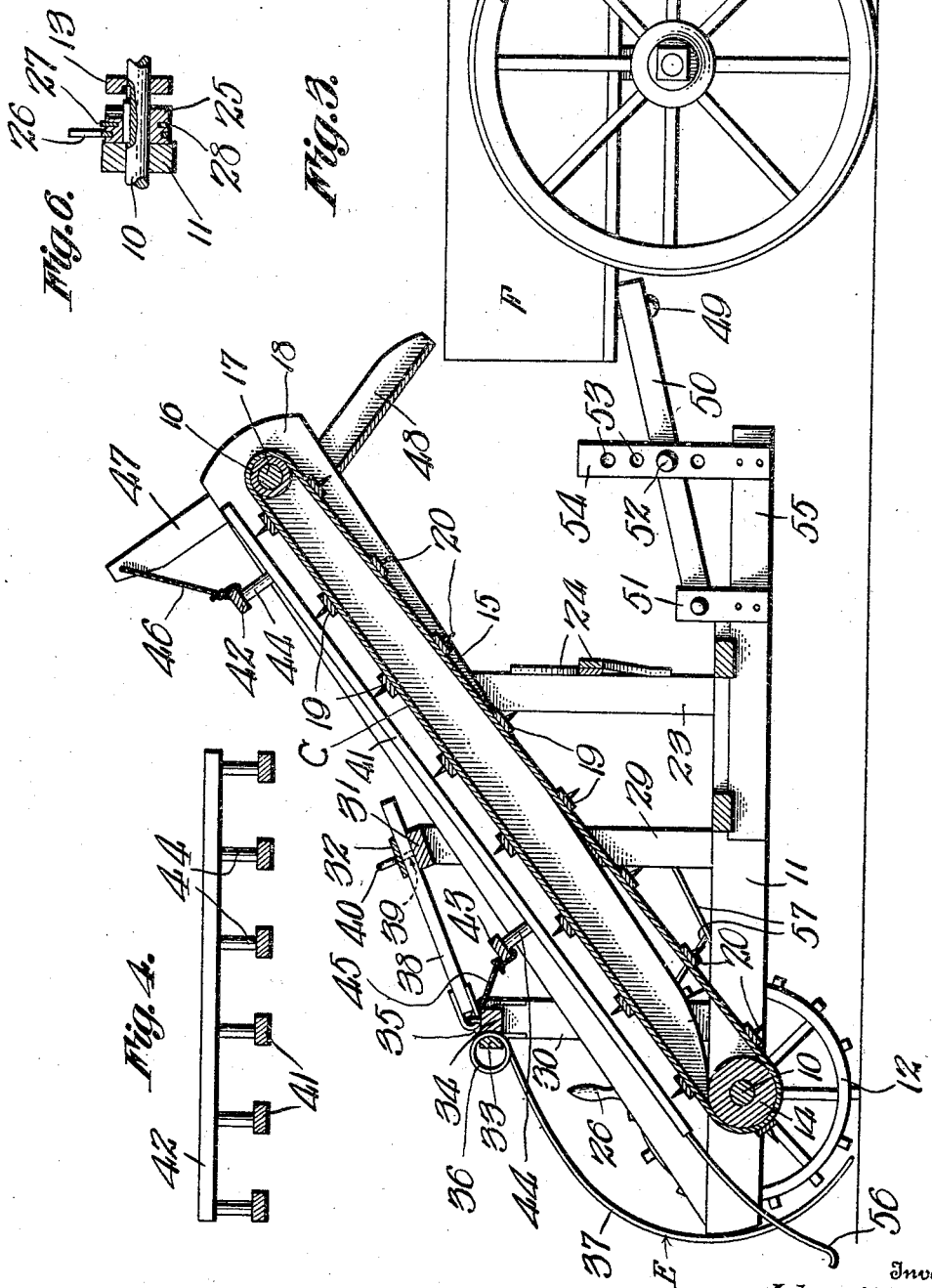
Witnesses
Chas. C. Richardson.
H. C. McCartney
Inventor
John Nelson,
By Crandle & Crandle
Attorneys

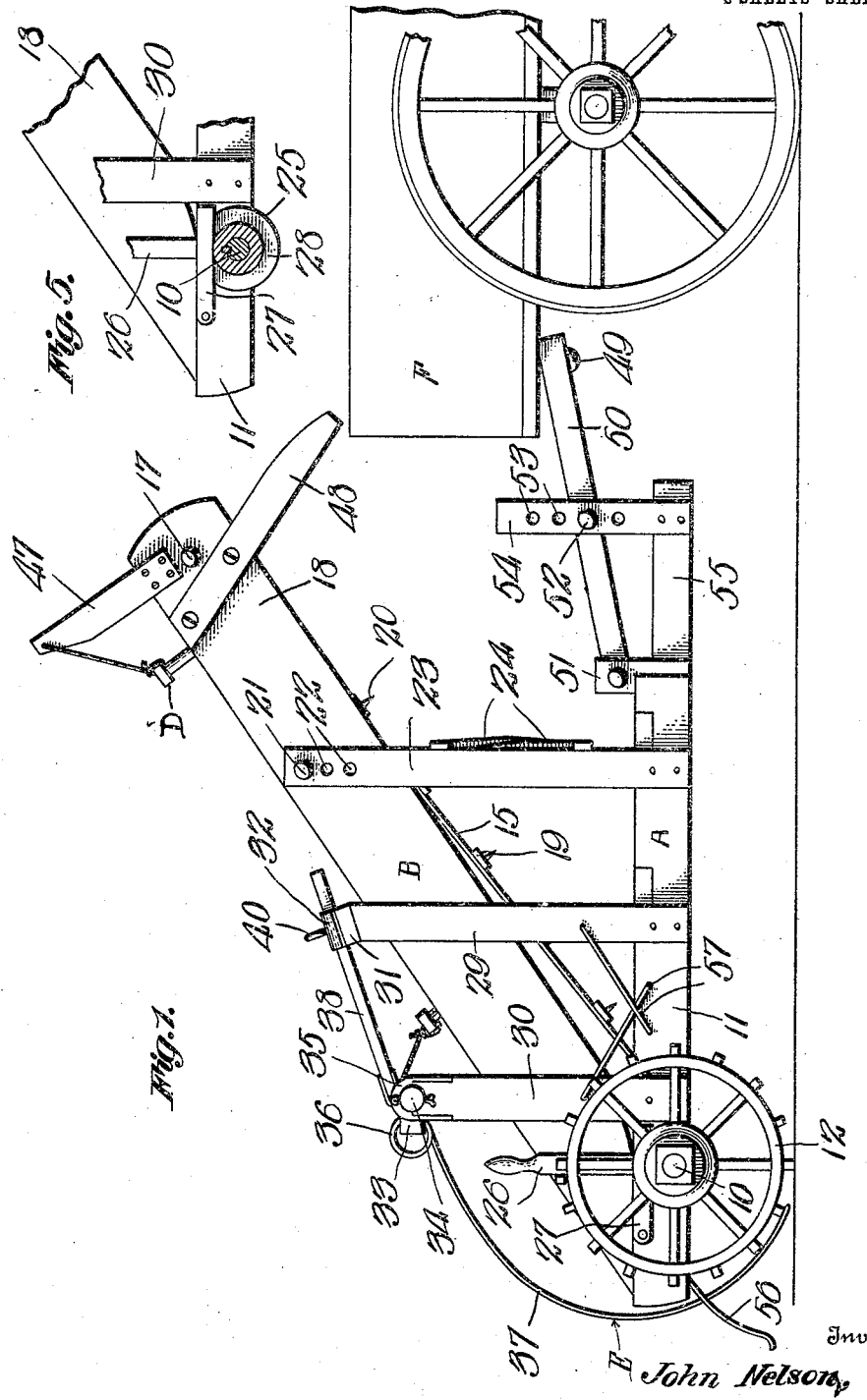

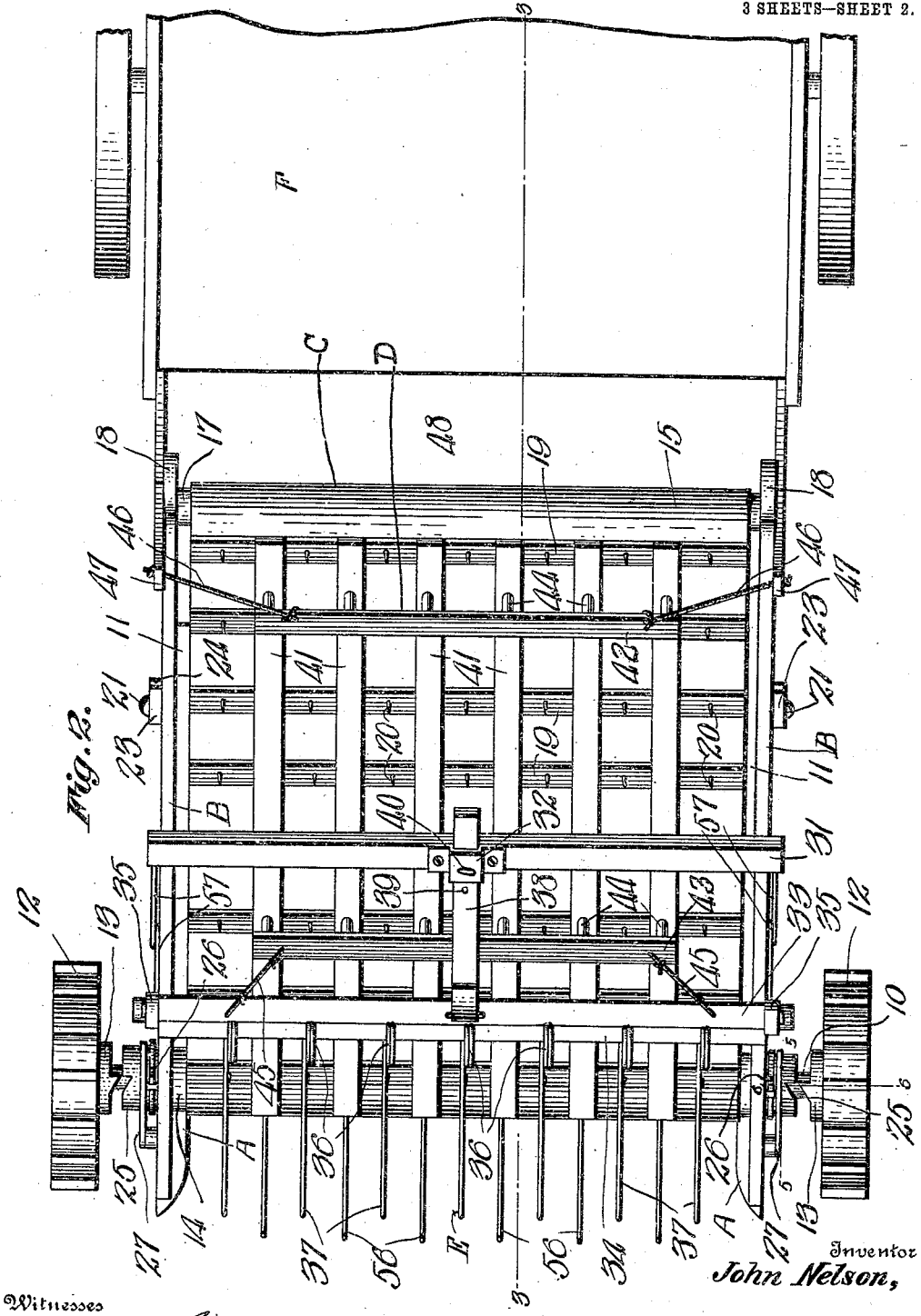

UNITED STATES PATENT OFFICE.

JOHN NELSON, OF COURTENAY, NORTH DAKOTA.

HAY-LOADER.

956,145.

Specification of Letters Patent.  Patented Apr. 26, 1910.

Application filed March 6, 1909. Serial No. 481,591.

*To all whom it may concern:*

Be it known that I, JOHN NELSON, a citizen of the United States, residing at Courtenay, in the county of Stutsman, State of North Dakota, have invented certain new and useful Improvements in Hay-Loaders; and I do hereby declare the following to be a full, clear, and exact description of the invention, such as will enable others skilled in the art to which it appertains to make and use the same.

The present invention relates to improvements in hay-loaders, and it has for its chief object the production of an extremely simple, inexpensive, and efficient apparatus of the type specified which is designed, when attached to a wagon, to gather the hay from the ground and deposit it in the wagon as the latter is driven over a field.

More especially, however, the invention resides in the provision of a self-regulating swinging cover suspended from standards secured to the frame of the apparatus and adapted to rise and fall automatically during the time that the conveying mechanism is in operation, according to the quantity of hay passing therebeneath.

The invention also resides to a material extent in the provision of means for adjusting the rake teeth toward and from the ground, and for retaining the same in such position.

With the above and other ends in view, the invention consists in the construction, combination and arrangement of parts, all as hereinafter fully described, specifically claimed, and illustrated in the accompanying drawings, wherein, Figure 1 is a side elevation of the improved loading apparatus attached to a wagon. Fig. 2 is a plan view of Fig. 1. Fig. 3 is a longitudinal vertical section taken on the line 3—3 of Fig. 2. Fig. 4 is a cross sectional view of the cover removed from the apparatus. Figs. 5 and 6 are detail vertical sections taken, respectively, on the lines 5—5 and 6—6 of Fig. 2, and illustrating one of the retaining springs engaged with the movable clutch members, and the manner in which said clutch member is mounted.

Referring more particularly to the drawings, A designates in a general manner, the main frame of the apparatus, B the supplemental frame which carries the conveyer C, D the cover suspended above the conveyer, E the rake, and F the body of the wagon to which the apparatus as a whole is designed for attachment.

The main frame A carries adjacent its rear end the axle 10 whose ends are journaled in openings formed in the side members 11 of said frame. Upon each end of the axle is loosely mounted a ground wheel 12 upon whose hub portion is formed, or rigidly secured as preferred, a clutch member 13. The central portion of the axle carries a roller 14 around which is trained the conveyer belt 15 whose upper end passes around a roller 16 secured to a shaft 17 disposed transversely of the supplemental frame and having its ends journaled in openings formed in the upper portions of the side members 18 of said frame. To this belt is secured a series of transversely arranged slats 19 each of which carries in turn a series of spurs 20, these devices preventing the hay from slipping down the belt when the latter is in motion.

The above mentioned belt together with its spurred slats is comprehended in the term "conveyer."

The supplemental frame B between whose side members the conveyer is located, as above described, is upwardly and forwardly inclined and is supported as a whole in pivotal relation to the main frame, to which end its side members 18 are formed centrally with alining perforations, and have their lower ends rounded, said ends resting upon the side members 11 of the main frame. The perforations, above referred to, are arranged to receive the inner ends of pins 21 which latter are in turn designed for interchangeable engagement in a vertical series of perforations 22 formed in each of a pair of standards 23 secured to the above mentioned members 11, the standards being connected together by a pair of braces 24. By reason of this construction it will be understood that the supplemental frame may be raised or lowered at will, and may be retained in adjusted position by inserting the pins 21 in the proper perforations 22 in the standards, the inner ends of the pins projecting into the perforations in the side members of the frame in question.

The hubs of the ground wheels 12 are provided, as above stated, with clutch members 13, said wheels and clutch members being loose upon the axle. With these clutch members a pair of fast clutch members 25 is arranged for engagement, the latter members being keyed to the axle, as shown in Fig. 6, so as to be capable of movement toward and from the loose clutch members, such movement being effected by means of levers 26 whose yoked ends fit in circumscribing grooves formed in said clutch members. The fast clutch members, however are held normally out of engagement with the loose clutch members and against the adjacent frame members 11 by means of flat springs 27, these springs being secured at one end to said frame members and having their free ends arranged for engagement in circumscribing grooves 28 formed in said fast clutch members. Hence, it will appear that when the pairs of clutch members are engaged, the rotation of the ground wheels will effect that of the axle, whereupon the conveyer will be set in motion.

The main frame has secured to its side members rearwardly of the standards 23 a second pair of standards 29, and rearwardly, in turn, of these last mentioned standards, a third pair 30. The upper ends of the standards 29 are joined by the cross-piece 31 upon the central portion of whose upper face is mounted an inverted U-shaped bracket 32 having a perforation formed in its top member. The upper ends of the rearmost standards 30 are joined by a rocking cross-bar 33, which forms the main member of the rake D, the rounded ends 34 of said bar fitting in bearings with which the standards are provided. This bar has secured thereto the coiled upper ends 36 of a series of bowed-spring teeth 37, the lower ends of which curve toward the conveyer, as shown. The rake teeth are of the usual type and hence require no extended description, it being merely necessary to state that their construction of spring metal enables them to yield when passing over obstructions, this effect being heightened by the formation of the coils 36.

In order to rock the cross-bar 33, and in consequence to raise or lower the rake teeth, said bar has hinged thereto a strap 38 which projects upwardly and forwardly and passes between the legs of the bracket 32. This strap is formed with a series of perforations 39 arranged to interchangeably receive the lower end of a pin 40, which is inserted through the perforation above mentioned in the top member of the bracket, provision of the pin enabling said strap, and in consequence the rake teeth to be retained in adjusted position.

Between the sides of the supplemental frame, and directed above the conveyer is located the cover D. This element consists of a series of longitudinally arranged bars 41, and upper and lower cross-pieces 42 and 43 to which said bars are connected by depending fingers 44. The lower cross-piece 43 is suspended from the rocking bar 33 by a pair of cables 45, while the upper cross-piece 42 is suspended by a pair of similar cables 46 from the upper ends of a pair of standards 47 secured to the upper ends of the side members 18 of the supplemental frame. Owing to the flexible connections between the cover as a whole and the standards 47 and rocking cross-bar 33, it will be apparent that the cover is capable of a rising and falling movement during the time that the conveyer is in motion, so as to automatically regulate itself to the quantities of hay which pass therebeneath, the provision of the cover having the effect of holding the hay upon the conveyer. In other words, the cover is self-regulating, in which respect it differs materially from the ordinary or stationary type of cover, which latter is incapable of adjustment and its employment is likely to cause the entire apparatus to become choked when hay is delivered in large quantities from the rake teeth to the conveyer. The hay upon leaving the conveyer falls upon a downwardly inclined chute 48 secured to the upper ends of the frame members 18, said chute overhanging the wagon body F.

The attachment of the apparatus as a whole to the wagon body is effected in the manner shown in Figs. 1 and 3, said body being provided with a depending pin 49 to which is connected the front end of a rod 50, whose rear end is pivoted to a block 51 secured to the front member of the main frame. This rod is formed with a central perforation arranged to receive the inner end of a pin 52 adapted for interchangeable engagement in a vertical series of perforations 53 formed in an upright 54 carried by the extension 55 of the main frame. The above described attachment of the apparatus to the wagon body enables the former to be raised or lowered to suit the height of the wagon as will be apparent. Each of the rods 41 is provided at its lower end with a spring arm 56, these arms projecting between the rake teeth and serving to prevent the passing of hay on to the cover. The pairs of uprights 29 and 30 are braced by cross-rods 57, shown in Fig. 1.

From the foregoing, it will be understood that the apparatus as a whole can be readily attached to and detached from a wagon body, that the apparatus may be adjusted to suit the height of the wagon body, and that the inclined supplemental frame is likewise capable of adjustment in order to permit the chute 48 to overhang the wagon body. Furthermore, it will be apparent that the cover is self-regulating, that the rake teeth which deliver the hay to the conveyer, are capable of adjustment toward and from the ground, and that the movement of the conveyer can be started and terminated at will.

Further description of the invention and its operation is deemed unnecessary.

What is claimed, is:—

1. In a loading apparatus, in combination, a frame; a conveyer located between the side members thereof; pairs of oppositely-arranged standards connected with said members; a rocking cross-piece connecting together the upper ends of one pair of standards; a series of rake teeth secured to said cross-piece; a cross-piece secured at its ends to the upper ends of the other pair of standards; a strap secured to the first-named cross-piece for rocking the same, to raise and lower said teeth, said strap projecting across the second-named cross-piece; and means carried by said second-named cross-piece and arranged for engagement with said strap, for holding said teeth in adjusted position.

2. In a loading apparatus, in combination, a frame; a conveyer located between the side members thereof; pairs of oppositely-arranged standards connected with said members; a rocking cross-piece connecting together the upper ends of one pair of standards; a series of rake teeth secured to said cross-piece; a cross-piece secured at its ends to the upper ends of the other pair of standards; a bracket secured to the second-named cross-piece; a strap secured to the first-named cross-piece for rocking the same, to raise and lower said teeth, said strap projecting between the legs of said bracket; and means arranged for engagement with said strap and bracket, for holding said teeth in adjusted position.

3. In a loading apparatus, in combination, a frame; a conveyer located between the side members thereof; pairs of oppositely-arranged standards connected with said members; a rocking cross-piece connecting together the upper ends of one pair of standards; a series of rake teeth secured to said cross-piece; a cross-piece secured at its ends to the upper ends of the other pair of standards; a perforated bracket secured to the second-named cross-piece; a strap secured to the first-named cross-piece for rocking the same, to raise and lower said teeth, said strap projecting between the legs of said bracket and being formed with a series of perforations; and a pin extending through the perforation in said bracket and having its lower end arranged for interchangeable engagement with said series of perforations, for holding said teeth in adjusted position.

In testimony whereof, I affix my signature, in presence of two witnesses.

JOHN NELSON.

Witnesses:
SANDY C. SATIE,
JOHN GIBSON.